United States Patent [19]
Krieger et al.

[11] Patent Number: 4,487,356
[45] Date of Patent: Dec. 11, 1984

[54] DEVICE HAVING EXPANDABLE MANDREL FOR MAKING NUCLEAR FUEL ELEMENT STORAGE TUBES

[75] Inventors: Friedrich Krieger, Würzburg; Otto Weis, Oberpleichfeld, both of Fed. Rep. of Germany

[73] Assignee: Gg. Noell GmbH., Würzburg, Fed. Rep. of Germany

[21] Appl. No.: 271,071

[22] Filed: Jun. 8, 1981

[51] Int. Cl.$^3$ ............................................. B23K 37/04
[52] U.S. Cl. .................................. 228/46; 228/49 R; 228/50; 72/392; 269/25
[58] Field of Search ................. 228/49 R, 50, 46, 222, 228/184; 269/48.1, 43, 25; 72/392, 370

[56] References Cited

U.S. PATENT DOCUMENTS

| | | | |
|---|---|---|---|
| 387,659 | 8/1888 | Saunders | 228/50 |
| 1,546,250 | 7/1925 | Phillips | 228/50 X |
| 2,383,314 | 8/1945 | Hubbard | 269/48.1 |
| 3,640,116 | 2/1972 | Hellman | 228/50 |

FOREIGN PATENT DOCUMENTS 2144049 2/1973 France ............................... 228/184

OTHER PUBLICATIONS

*Welding and Metal Fabrication*, Sep. 1982, p. 331.

Primary Examiner—Kenneth J. Ramsey

[57] ABSTRACT

A device for manufacturing containers for storing nuclear materials. The purpose of the device is to maintain angular sheet metals in the precise position required during the welding operation which is performed along the outer edges of their flange portions. The device includes a core, a thrust bearing and a counter-pressure bearing. The core is sub-divided into two separate core portions. Spring means tend to draw the core portions toward each other. Fluid operated cylinder-piston units tend to separate the core portions against the action of said spring means. Adjustment screw means provided with abutment means and screwed into one of said core portions project into the other of said core portions with the abutment means thereof. The second core portion has abutment means cooperating with the abutment means on said adjustment screw means.

6 Claims, 6 Drawing Figures

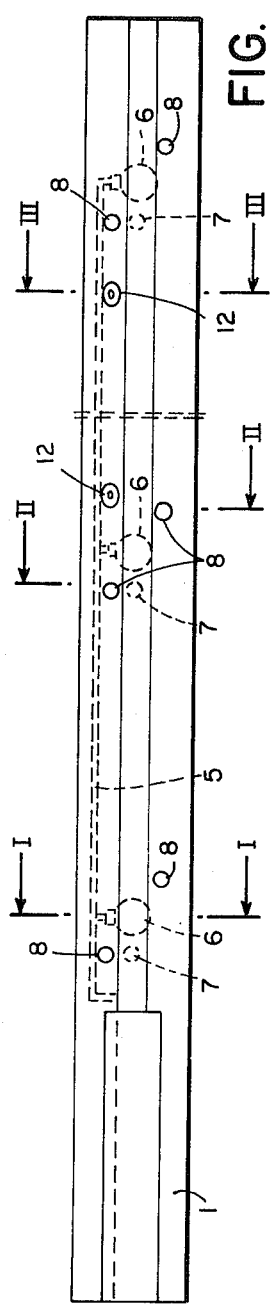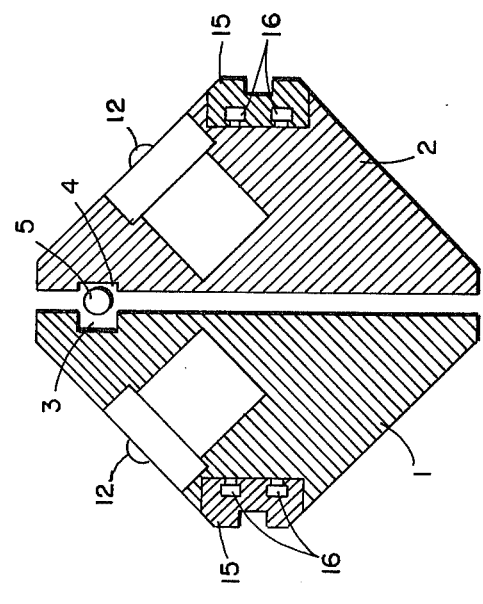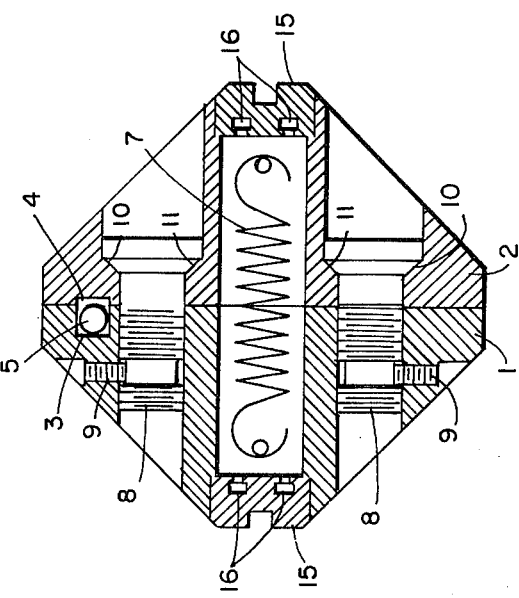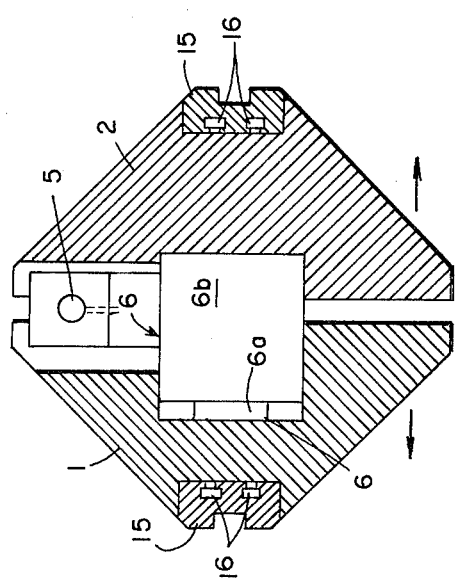

DEVICE HAVING EXPANDABLE MANDREL FOR MAKING NUCLEAR FUEL ELEMENT STORAGE TUBES

BACKGROUND OF THE INVENTION

The present invention relates to a device for making hollow bodies for receiving the fuel elements of nuclear power plants. Such hollow bodies are made by welding together a pair of angular sheet-metal ribbons along the edges thereof. The manufacture of the aforementioned hollow bodies is a difficult task because the aforementioned angular sheet-metal ribbons must have flanges of exactly equal width, and must be absolutely planar or, to be more specific, the entire hollow body must be limited by absolutely planar surfaces. These requirements derive from the fact that the hollow bodies must be able to be combined to form a storage structure, and that their spacing must, therefore, be rigorously equal. The above requirements must also be met to be able to effect a sound radiation shielding.

It is, therefore, the principal object of the present invention to provide a device for welding the aforementioned angular sheet metal ribbons into the aforementioned hollow bodies without occurrence of stresses in them.

Another object of this invention is to provide a device allowing to weld two angular sheet metals into hollow bodies that meet the above requirements but have different cross-sectional configurations.

Still another object of this invention is to improve prior art devices for performing the above welding operation which include a thrust bearing or thrust block, a counterpressure bearing and a core.

Other objects of this invention and advantages thereof will become more apparent as this specification proceeds.

SUMMARY OF THE INVENTION

Means for manufacturing out of two pieces of sheet metal in the form of angles hollow bodies for storing the fuel elements of nuclear power plants. To this end two angular pieces of sheet metal are welded together along edges of their flanges. The process requires great precision.

The angular pieces are supported by two core portions, or one core split by a gap of variable width into two core portions. The width of the gap may be increased by fluid operated cylinder-piston units, and it may be decreased by helical spring means whose ends are attached to one of the two pairs of core portions. The spacing between the two core portions is determined by one or two adjustment screws screwed into one of the two core portions and having ends projecting into the other of the two core portions. These ends form abutment surfaces which cooperate with abutment surfaces on said other of the two core portions. Preferably both abutment surfaces are of conical shape.

BRIEF DESCRIPTION OF THE DRAWINGS

FIG. 1 is a side elevation of the core;

FIG. 2 shows a section along I—I of FIG. 1;

FIG. 3 shows a section along II—II of FIG. 1 in non-stressed position;

FIG. 4 shows a section along III—III of FIG. 1;

DESCRIPTION OF PREFERRED EMBODIMENT

Figure 5:
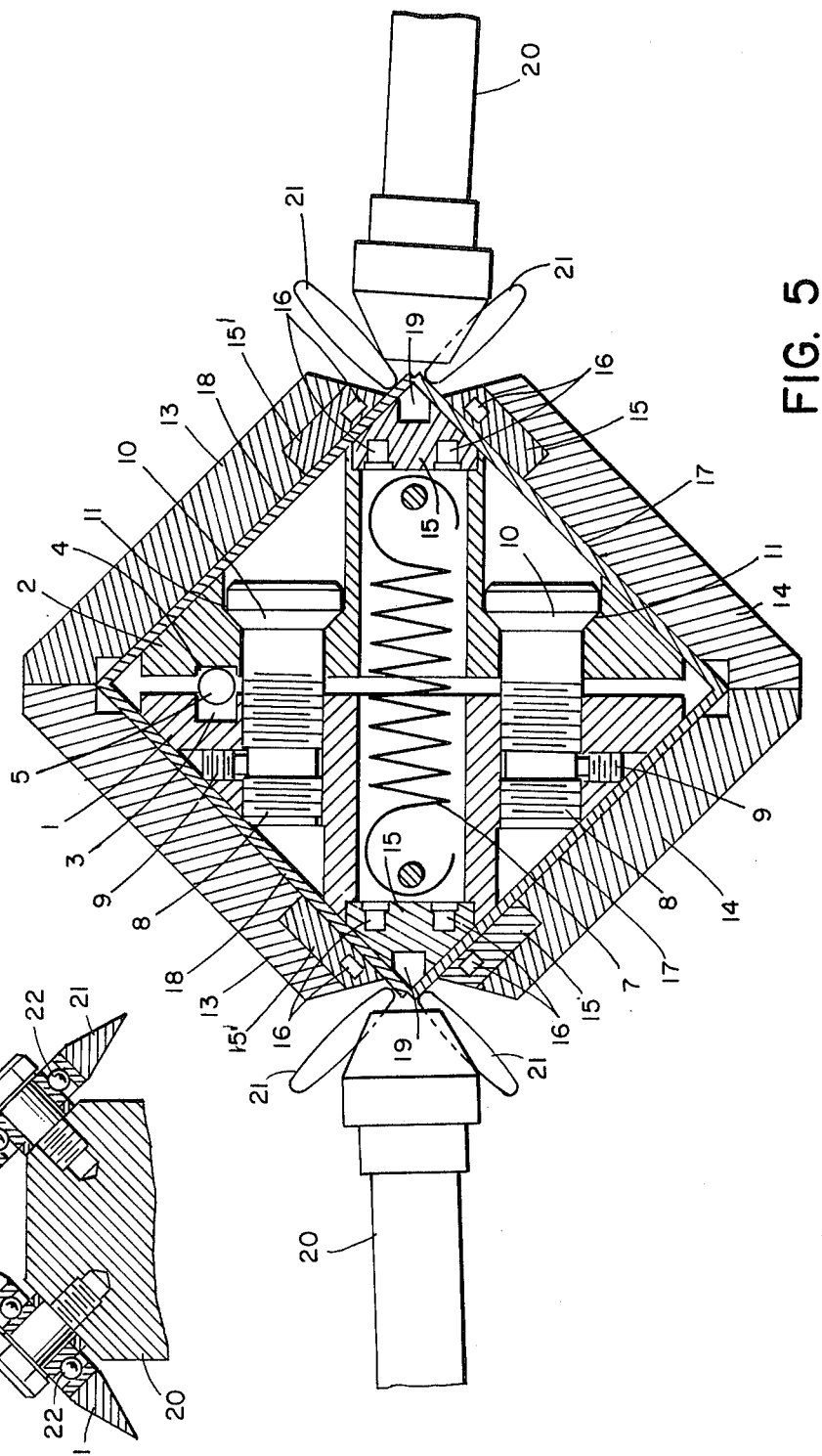
FIG. 5 shows in greater detail the same section as FIG. 3 with its surrounding thrust bearing and counterpressure bearing and with a helical tension spring.

In the present embodiment of the invention reference numerals 1 and 2 have been applied to indicate a core made up of two parts intended to form a hollow body substantially square in cross-section. The outer surfaces of core parts 1 and 2 are mirror images of each other. They are movable relative to each other along their vertical diagonal plane of symmetry. The insides of cores 1 and 2 are provided with recesses 3 and 4 as clearly shown in FIG. 4. Recesses 3 and 4 are intended to receive a conduit 5 for a hydraulic fluid. Conduit 5 is connected to cylinder-and-piston motors 6 which may be of any desired design. As shown in FIG. 2, cylinder-piston motors 6 include a piston 6a which, as shown in FIG. 2, is in one of its limit positions separating cores 1 and 2. The cylinders 6b of motors 6 are inserted into cavities of cores 1 and 2. Fluid under pressure may be admitted to and removed from the cylinders by valves (not shown). Helical tension springs 7 are arranged adjacent cylinder-and-piston motors 6. One of the ends of springs 7 is affixed to core members 1 and the other end of springs 7 is affixed to core members 2. Thus springs 7 tend to pull core parts 1 and 2 toward each other. The stroke of cylinder-and-piston motors 6 is limited by adjustment screws 8 which are preferably arranged in pairs in core part 1. Adjustment screws 8 are provided with cone-shaped abutment surfaces 10 which engage corresponding abutment surfaces 11 in core part 2 when core part 2 is moved relative to core part 1. The desired position of adjustment screws 8 may be fixed by set-screws 9 of which each is arranged at right angles to one of adjustment screws 8. Both core parts 1 and 2 are provided with spring-biased balls 12 as clearly shown in FIGS. 1 and 4. A copper bar 15 is arranged at opposite ends of core parts 1 and 2 provided with channels 16 for a fluid for the removal of heat. In like fashion copper bars 15' are provided in thrust-bearings 13 and in counterpressure bearings 14 defining ducts 16 for the circulation of a cooling medium. Reference numerals 17 and 18 have been applied to indicate the sheet metal ribbons to be joined by welding at the two points where they meet. At these points the copper bars 15 in cores 1 and 2 are provided with grooves 19 through which a gas is circulated to keep the oxygen contained in the atmosphere away from the welding joints. Numerals 20 have been applied to indicate the welding-joint-forming electrodes.

In order to manufacture a hollow body from angularly bent equilateral pieces of sheet metal 17, such a piece of sheet metal is inserted into the counterpressure bearing 14. Thereafter both parts 1 and 2 of the core are placed upon the piece of sheet metal 17. When placed upon sheet metal 17, there are no forces stressing core parts 1 and 2. Thereupon a second angularly bent metal sheet 18 is placed upon cores 1 and 2. Thereafter the hydraulic duct 5 containing an appropriate operating fluid is opened, admitting such fluid under pressure to cylinder-piston motor 6. As a result, the cores 1 and 2 are moved to opposite directions, until the cone-shaped surfaces 10 of screws 8 abut against the cone-shaped abutment surfaces 11 of core portions 2. This assures precise joints between parts 17 and 18 and, in addition thereto, assures maintenance of the above referred-to requirements in regard to equality of the width of the flanges of parts 17,18 as well as the planarity of the boundary surfaces of the hollow sheet metal containers formed by flanges 17,18. Thereupon the thrust bearing 13 is placed upon sheet metal part 18.

The sheet metal ribbons 17,18 are joined by an automatic welding machine the welding heads of which have been designated by reference numeral 20. Each welding head is provided with roller means 21 against which the outsides of sheet metal strips 17,18 abut, thus supporting said strips.

It should be observed that the drawings show cores 1 and 2 in different positions. In FIGS. 2 and 4 the cylinder-piston-motor 6 is actuated and has caused separation of core parts 1 and 2 against the action of springs 7. In FIG. 3 the forces of springs 7 have overcome the forces of de-energized motors 6 and have caused engagement of cores 1 and 2.

The fluid passageway 5 may be in the form of a hose common to all fluid motors 6.

Figure 6:
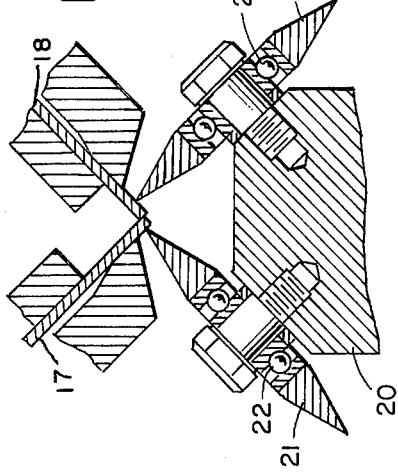
FIG. 6 shows a part not pertaining to, but better illustrating this invention.

The parts 20 of FIG. 5 are conventional automatic welding machines. To these automatic welding machines the roller systems 21 have been added as shown in FIG. 6 in greater detail. In FIG. 6 each welding electro 20 is provided with a pair of rotatable welding control arms 21 enclosing an angle of 90 deg. Each of welding control arms 21 is provided with a roller bearing 22. The inner ends of welding control arms 21 press against the outer surfaces of sheet metals 17,18 where sheet metals 17,18 meet and thus establish neat welding joints.

When the hollow sheet metal contianer is formed the thrust bearing 13 is lifted or raised in upward direction and pressure is removed from the cylinder-piston units 6. This, in turn, causes springs 7 to draw core members 1 and 2 toward one another. Thereafter core 1,2 may easily be removed from the sheet metal container 17,18 on account of roller bearings 12 minimizing friction between hollow container 17,18 and core members 1 and 2. Core members 1 and 2 are preferably provided with means adpated to cooperate with drawing tools to facilitate the separation of core members 1 and 2 from container 17,18.

We claim as our invention:

1. A device for manufacturing hollow containers of sheet metal for the fuel elements of nuclear power plants including a core, and a thrust bearing and a counterpressure bearing surrounding said core, said device comprising
    (a) a pair of separate core portions;
    (b) spring means tending to draw said pair of core portions toward each other;
    (c) fluid operated cylinder-piston units tending to separate said pair of core portions against the action of said spring means;
    (d) adjustment screw means in one of said pair of core portions having first abutment means; and
    (e) second abutment means in the other of said pair of core portions cooperating with said first abutment means.
2. A device as claimed in claim 1 comprising
    (a) a pair of parallel screw-threads in one of said core portions cooperating with a pair of said adjustment screw means;
    (b) a pair of set-screws in said one of said pair of separate core portions each cooperating with one of said pair of adjustment screws;
    (c) said pair of adjustment screws projecting into the other of said pair of core portions;
    (d) each of said pair of adjustment screws having a conical abutment surface; and
    (e) a pair of conical abutment surfaces in said other of said pair of core portions each cooperating with one of said conical abutment surfaces of one of said pair of adjustment screws.
3. A device as specified in claim 1 wherein the axis of said spring means is parallel to the axis of said adjustment screw means.
4. A device as specified in claim 1 wherein each of said pair of separate core portions is provided with an insert of a good heat conductor.
5. A device as specified in claim 4 wherein said insert of each of said pair of separate core portions defines a passageway for a cooling medium.
6. A device as specified in claim 4 wherein said insert of each of said pair of separate core portions defines a passageway adapted to keep oxygen away from the junction to be formed by welding.

* * * * *